(No Model.)
W. DUXBURY.
GLASS-FACED TILE, BRICK, &c.
No. 550,954. Patented Dec. 10, 1895.
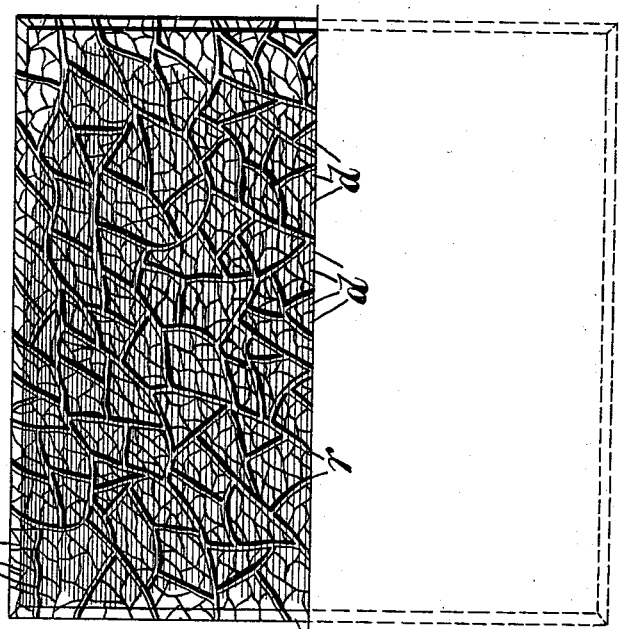
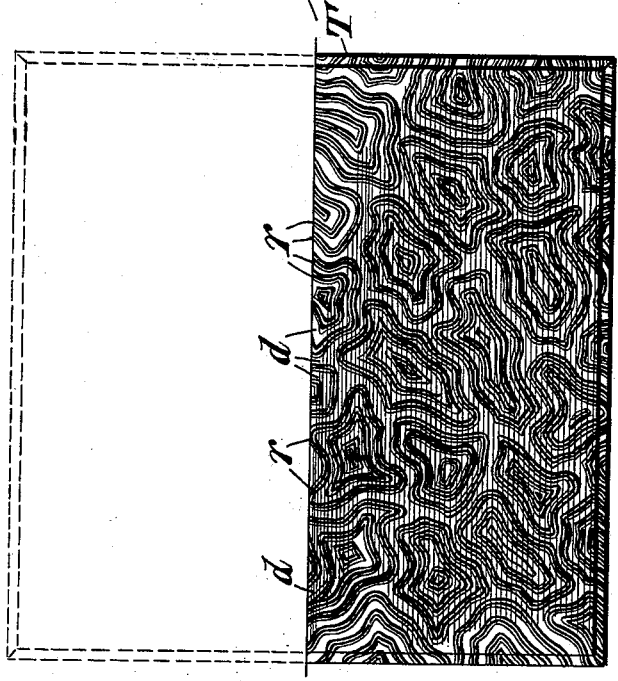
Witnesses:
H. G. Dieterich
Henry Ott
Inventor
William Duxbury
By Henry Ott, Atty

UNITED STATES PATENT OFFICE.

WILLIAM DUXBURY, OF LONDON, ENGLAND.

GLASS-FACED TILE, BRICK, &c.

SPECIFICATION forming part of Letters Patent No. 550,954, dated December 10, 1895.

Application filed December 27, 1893. Serial No. 494,880. (No model.) Patented in England November 10, 1892, No. 20,286.

*To all whom it may concern:*

Be it known that I, WILLIAM DUXBURY, a subject of the Queen of Great Britain, residing at London, in the county of Middlesex, England, have invented certain new and useful Improvements in Glass-Faced Tiles, Bricks, Moldings, Cornices, and other Building Forms, (for which I have received Letters Patent in Great Britain, No. 20,286, dated November 10, 1892;) and I do hereby declare that the following is a full, clear, and exact description of the invention, which will enable others skilled in the art to which it appertains to make and use the same.

My invention has relation to the manufacture of ornamental tiling and more particularly to ornamental glass tiling.

The difficulties in setting glass tiles so as to permanently retain their position, whether on floors, walls, or ceilings, are well understood, and various modes of construction have been proposed, but so far as I am aware with but indifferent results.

My invention has for its object the construction of a glass tile or other building form that will not only overcome the difficulty referred to, but in which the means resorted to for the purpose are made available for ornamenting the tile or building form and producing very pleasing and, in fact, striking effects, as will now be fully described, reference being had to the accompanying drawings, in which—

Figures 1 and 2 are face views of tiles illustrating different ornamental arrangements for providing a firm hold for the cement or mortar in which the tile is to be set or for a backing therefor. Fig. 3 is a cross-section of the tile shown in Fig. 1.

Practice has demonstrated long ago that a glass tile cannot be made to stick to a bed of cement or mortar unless means are provided to key the same thereto. It has been proposed to groove or corrugate the back of the tile, and it has also been proposed to form undercut ridges or ribs on said back of the tile and embed the latter in a suitable cement; but these ridges or ribs are very difficult to form and cannot well be formed along two of the edges of the tile, thus leaving smooth borders, on which the mortar or cement in which the tile is set has no hold. Furthermore, the tile being transparent clearly shows either the grooves or ridges, producing an unpleasant effect.

I have discovered that a permanent hold upon the tile by the cement or mortar can only be obtained by so corrugating the back of the tile as to form a large number of ridges and depressions running in various directions, so that a suitable backing may be provided for the tile, upon which the cement or mortar in which the tile is set has a firm hold. In order to produce a pleasant effect, I so arrange these ridges and depressions as to form ornamental designs and provide a backing that may be white or tinted in any desired color, giving the appearance of colored glass and producing very pleasing effects, or colored or stained glass may be used.

In the drawings, *r* indicates the ridges, and *d* the depressions, of the tile T, which may be made as follows: The design is formed in the back of the sheet of glass while still plastic. A piece of such of proper size and shape is then placed in a suitable mold with the roughened or ornamented side upward. I then pour upon the ornamented side of the glass a cement that will readily set and harden, preferably a cement or mortar composed of a mixture of Halken Mountain lime or other lias and Buxton or other lime reduced to a plastic or preferably semi-fluid consistence, to which I then add from ten to twenty-five per cent. of so-called "Keen's mixture," (which is a cement of the same special character,) together with some pulverized material—as, for instance, ground slate, brick-dust, or the like—in a proportion not exceeding sixty-five per cent. of the entire compound. The Keen's mixture is added after slaking and while the mortar is still warm, though it may be added after the mortar has cooled, and said mixture is used chiefly because it increases the adhesiveness of the mortar, and also because it shows through the glass facing as a bright surface, the ornamentation changing in appearance with the direction in which the light strikes the glass face of the tile.

The mold may be made of any suitable material and if made tapering upwardly the edges of the backing *b* will be beveled, as shown, so that a fine joint between the tiles is obtained. In order to cause the backing *b* to firmly stick to the cement or mortar in which the tile is to be set, I groove or corrugate the same, as usual, and this may readily be done by grooving two opposite side walls of the mold and using a correspondingly-grooved striker.

It will be understood, of course, that my invention is applicable also to other building forms—such as bricks, moldings, and the like—having one or more glass faces.

Having thus described my invention, what I claim as new therein, and desire to secure by Letters Patent, is—

As an article of manufacture, a composite tile consisting of a thin or comparatively thin sheet of glass having the entire surface of one side provided with irregular ridges and depressions and a thick or comparatively thick backing covering the said irregular surface, said backing consisting of a cement composed of a mixture of lime and lias together with Keen's mixture and a pulverulent material, as ground slate, substantially as and for the purpose set forth.

WILLIAM DUXBURY.

Witnesses:
   VICTOR JENSEN,
   THOMAS LAKE.